(12) United States Patent
Ali et al.

(10) Patent No.: US 9,507,861 B2
(45) Date of Patent: Nov. 29, 2016

(54) ENHANCED QUERY REWRITING THROUGH CLICK LOG ANALYSIS

(75) Inventors: Alnur Ali, Kirkland, WA (US); Jianfeng Gao, Kirkland, WA (US); Xiaodong He, Issaquah, WA (US); Bodo von Billerbeck, Melbourne (AU); Sanaz Ahari, Bellevue, WA (US)

(73) Assignee: Microsoft Technolgy Licensing, LLC, Redmond, WA (US)

( * ) Notice: Subject to any disclaimer, the term of this patent is extended or adjusted under 35 U.S.C. 154(b) by 744 days.

(21) Appl. No.: 13/078,553

(22) Filed: Apr. 1, 2011

(65) Prior Publication Data

US 2012/0254217 A1    Oct. 4, 2012

(51) Int. Cl.
*G06F 17/30* (2006.01)

(52) U.S. Cl.
CPC ... *G06F 17/30864* (2013.01); *G06F 17/30672* (2013.01)

(58) Field of Classification Search
CPC .................... G06F 17/30672; G06F 17/30864
USPC ........................................................ 707/765
See application file for complete search history.

(56) References Cited

U.S. PATENT DOCUMENTS

| | | | |
|---|---|---|---|
| 7,809,715 B2 | 10/2010 | Wei et al. | |
| 7,953,746 B1 * | 5/2011 | Garg et al. | 707/762 |
| 2007/0050351 A1 | 3/2007 | Kasperski et al. | |
| 2007/0208730 A1 * | 9/2007 | Agichtein et al. | 707/5 |
| 2008/0082477 A1 | 4/2008 | Dominowska et al. | |
| 2008/0120276 A1 | 5/2008 | Chennavasin | |
| 2009/0164895 A1 * | 6/2009 | Baeza-Yates et al. | 715/700 |
| 2009/0198672 A1 | 8/2009 | Jones et al. | |
| 2009/0265290 A1 | 10/2009 | Ciaramita et al. | |
| 2009/0299964 A1 * | 12/2009 | Cameron et al. | 707/3 |
| 2010/0010895 A1 | 1/2010 | Gabrilovich et al. | |
| 2010/0057687 A1 * | 3/2010 | Shen et al. | 707/3 |
| 2010/0082510 A1 * | 4/2010 | Gao et al. | 706/20 |
| 2010/0094855 A1 | 4/2010 | Rouhani-Kalleh | |
| 2010/0114929 A1 * | 5/2010 | Bonchi et al. | 707/759 |
| 2010/0138428 A1 | 6/2010 | Uchino et al. | |
| 2010/0274821 A1 * | 10/2010 | Bernstein | G06F 17/30864 707/808 |
| 2010/0306229 A1 * | 12/2010 | Timm et al. | 707/767 |
| 2010/0325133 A1 * | 12/2010 | Rounthwaite | G06F 17/30864 707/759 |

(Continued)

OTHER PUBLICATIONS

Baeza-Yates et al. "Query Recommendation Using Query Logs in Search Engines" ,EDBT 2004Workshops, LNCS 3268, pp. 588-596, 2004.*

(Continued)

*Primary Examiner* — Shew-Fen Lin
(74) *Attorney, Agent, or Firm* — Dave Ream; Tom Wong; Micky Minhas

(57) ABSTRACT

Systems, methods, and computer media for identifying related strings for search query rewriting are provided. Session data for a user search query session in an accessed click log data is identified. It is determined whether a first additional search query in the session data is related to a first user search query based on at least one of: dwell time; a number of search result links clicked on; and similarity between web page titles or uniform resource locators (URLs). When related, the first additional search query is incorporated into a list of strings related to the first user search query. One or more supplemental strings that are related to the first user search query are also identified. The identified supplemental strings are also included in the list of strings related to the first user search query.

15 Claims, 7 Drawing Sheets

(56) References Cited

U.S. PATENT DOCUMENTS

2011/0035402 A1* 2/2011 Agrawal et al. .............. 707/769
2011/0060736 A1* 3/2011 Bailey et al. ................. 707/727
2011/0087680 A1 4/2011 Murdock et al.

OTHER PUBLICATIONS

Beeferman et al. "Agglomerative clustering of a search engine query log", In KDD, pp. 407-416, 2000.*
Wen et al. "Query Clustering Using User Logs",ACM Transactions on Information Systems, vol. 20, No. 1, Jan. 2002, pp. 59-81.*
Beeferman et al. "Agglomerative clustering of a search engine query log",KDD, ACM, 2000, Boston, MA USA.*
Zhang, et al., "Comparing Click Logs and Editorial Labels for Training Query Rewriting", A workshop at the 16th International World Wide Web Conference on Query Log Analysis: Social and Technological Challenges, May 8-12, 2007, 4 pages.
Riezler, et al., "Query Rewriting using Monolingual Statistical Machine Translation", In Journal on Computational Linguistics, vol. 36, Issue 3, Sep. 2010, 14 pages.
Antonellis, et al., "Simrank++: Query Rewriting through Link Analysis of the Click Graph (Poster)", In Proceeding of the 17th International Conference on World Wide Web, Poster Paper, Apr. 21-25, 2008, 2 pages.
Riezler, et al., "Statistical Machine Translation for Query Expansion in Answer Retrieval", In Proceedings of the 45th Annual Meeting of the Association of Computational Linguistics, Jun. 2007, 8 pages.
Shi, et al., "Mining Related Queries from Web Search Engine Query Logs Using an Improved Association Rule Mining Model", In Journal of the American Society for Information Science and Technology, vol. 58, Issue 12, Oct. 2007, 13 pages.
"Ma, et al., ""Page Hunt: Improving Search Engines Using Human Computation Games""", In Proceedings of the 32nd international ACM SIGIR conference on Research and development in information retrieval, Published on: Jul. 19-23, 2009, 2 pages."
"Ganti, et al., ""Keyword++: A Framework to Improve Keyword Search Over Entity Databases""", In Proceedings of the VLDB Endowment"", vol. 3, Issue 1-2, Published on: Sep. 13-17, 2010, 12 pages."
"Dignum, et al., ""Incorporating Seasonality into Search Suggestions Derived from Intranet Query Logs""", In Incorporating Seasonality into Search Suggestions Derived from Intranet Query Logs,"" wi-iat, vol. 1, IEEE/WIC/ACM International Conference on Web Intelligence and Intelligent Agent Technology, Aug. 31-Sep. 3, 2010, 6 pages."
"Debugging Search Application Relevance Issues", Retrieved on: Jan. 17, 2011,Available at: http://www.lucidimagination.com/Community/Hear-from-the-Experts/Articles/Search-Application-Relevance-Issues.
Non-final Office Action, mailed Mar. 25, 2013, in related U.S. Appl. No. 13/078,648, 29 pages.
Final Office Action dated Oct. 1, 2013 in U.S. Appl. No. 13/078,648, 24 pages.
Notice of Allowance dated Feb. 26, 2014 in U.S. Appl. No. 13/078,648, 11 pages.
Ji-Rong Wen, Jian-Yun Nie, and Hong-Jiang Zhang, "Clustering User Queries of a Search Engine", WWW1 0, May 1-5, 2001, Hong Kong, ACM, pp. 162-168.
Gui-Rong Xue, Hua-Jun Zeng, Zheng Chen, Yong Yu, Wei-Ying Ma, WenSi Xi, and WeiGuo Fan, "Optimizing Web Search Using Web Click-through Data", CIKM'04, Nov. 8-13, 2004, Washington, DC, USA, ACM, pp. 118-126.
Benjamin Piwowarski and Hugo Zaragoza, "Predictive User Click Models Based on Click-through History", CIKM'07, Nov. 6-8, 2007, Lisboa, Portugal, ACM, pp. 175-182.
Fan Guo, Chao Liu, and Vi-Min Wang, "Efficient Multiple-Click Models in Web Search", 2008, ACM, pp. 124-131.

* cited by examiner

ENHANCED QUERY REWRITING THROUGH CLICK LOG ANALYSIS

CROSS-REFERENCE TO RELATED APPLICATIONS

This application is related by subject matter to commonly assigned and concurrently filed application U.S. application Ser. No. 13/078,648, titled "Enhanced Query Rewriting Through Statistical Machine Translation," which is hereby incorporated by reference in its entirety.

BACKGROUND

Internet searching has become increasingly common in recent years. In many cases, a user's first attempt at performing a search query does not yield desired results. Typically, the user then reformulates the search query in an attempt to return the desired results. The problem of a user's entered query not identifying the results the user is seeking is known as the "query-document vocabulary mismatch." Conventional search engines may attempt to solve this problem by automatically reformulating queries or suggesting replacements for particular terms in the search query. For example, when a user's search includes the term "bio," the search engine may also search using the term "biography." Search engines conventionally rely on user data such as lists of frequently submitted queries, human-created or human-annotated lists such as thesauri, and other sources. Human-created and human-annotated lists in particular include inherent biases. Additionally, while pairs of query terms and replacement terms in these lists may seem appropriate to a human reviewer, the replacement terms will not necessarily solve the query-document vocabulary mismatch and cause the search engine to return more relevant documents.

SUMMARY

Embodiments of the present invention relate to systems, methods, and computer media for identifying related strings for search query rewriting. Using the systems and methods described herein, click log data is accessed. Session data for a user search query session in the accessed click log data is identified. The session data includes: a first user search query; search results provided for the first user search query; one or more additional search queries; and search results provided for the one or more additional search queries. It is then determined whether a first additional search query in the session data is related to the first user search query based on at least one of: dwell time; a number of search result links clicked on; and similarity between web page titles or uniform resource locators (URLs). Upon determining that the first additional search query is related to the first user search query, the first additional search query is incorporated into a list of strings related to the first user search query. Also using the systems and methods described herein, one or more supplemental strings that are related to the first user search query are identified. The identified supplemental strings are also included in the list of strings related to the first user search query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Figure 1:
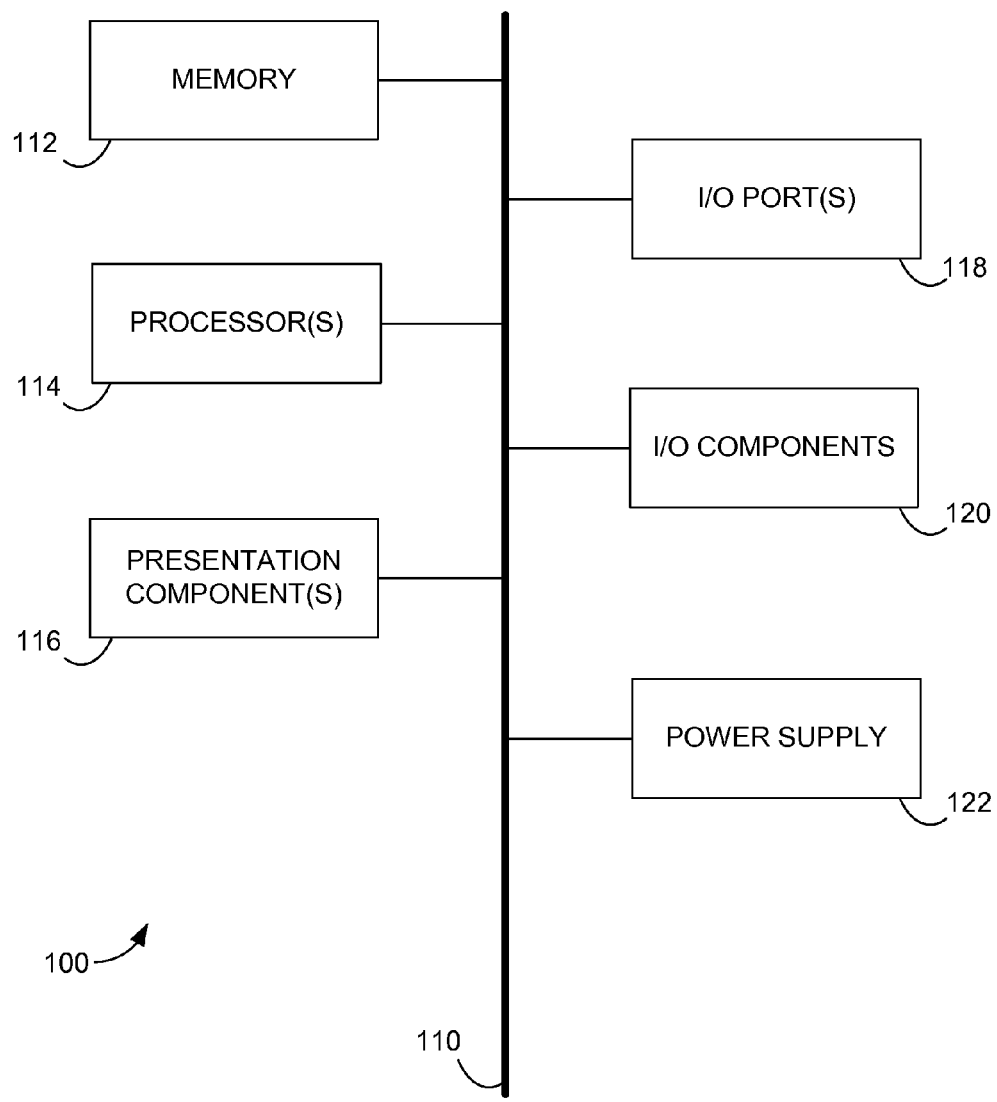
FIG. 1 is a block diagram of an exemplary computing environment suitable for use in implementing embodiments of the present invention.

Embodiments of the present invention are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention relate to systems, methods, and computer media for identifying related strings for search query rewriting. In accordance with embodiments of the present invention, strings related to a user search query are identified by analyzing click log data. The user search query and related strings can then be input into a statistical machine translation model to identify query rewriting replacement candidate terms. A search engine can then use the identified query rewriting candidate terms to more accurately rewrite received user search queries.

As discussed above, the query-document vocabulary mismatch often leads to search results that a user finds unhelpful. Various existing sources of replacement terms for particular search terms do not necessarily provide improved results. Identifying query rewriting replacement candidate terms through a process removed from human bias and limitations provides much improved results. Search engine user click log data provides a source of information that can be analyzed to identify improved query rewriting candidate terms. Click logs include the search queries users enter, results provided, result web page links clicked on, dwell time for the results page and clicked-on links, and other information.

Click log data can be analyzed to identify additional search queries that are related to a particular user search query. A determination of relatedness can be based on, among other things, dwell time, a number of search result links clicked on, and similarity between web page titles or uniform resource locators (URLs). Supplemental strings related to the particular user query can also be identified from the click log data. Supplemental strings may include a title, URL, or snippet associated with a web page included in provided search results that was clicked on after the results were provided. Supplemental strings may also include a second user search query identified as being related using random walk analysis. Additional search queries and supplemental strings determined to be related to a particular user search query can be incorporated into a list of strings related to the particular user search query.

Pairs of strings from the list (or other list of related strings) can then be provided as inputs to a statistical machine translation (SMT) model. The SMT model effectively considers the first string to be one language and the second string to be another language and identifies pairs of corresponding terms from a string pair that can be considered to be query rewriting replacement candidate terms. When the probability of relatedness of two terms is above a threshold, both terms in the pair, as well as the corresponding probability of relatedness, can be incorporated into a query rewriting candidate database. This database can be accessed by search engines to select query replacement terms that reduce the query-document vocabulary mismatch.

In one embodiment of the present invention, click log data is accessed. Session data for a user search query session in the accessed click log data is identified. The session data includes: a first user search query; search results provided for the first user search query; one or more additional search queries; and search results provided for the one or more additional search queries. It is then determined whether a first additional search query in the session data is related to the first user search query. The determination is based on at least one of: dwell time; a number of search result links clicked on; and similarity between web page titles or uniform resource locators (URLs). Upon determining that the first additional search query is related to the first user search query, the first additional search query is incorporated into a list of strings related to the first user search query.

In another embodiment, a database contains click log data. A session extraction component identifies session data for a user search query session in the click log data. The session data includes: a first user search query; search results provided for the first user search query; one or more additional search queries; and search results provided for the one or more additional search queries. A query analysis component determines whether a first additional search query in the session data is related to the first user search query. The determination is made based on at least one of: dwell time on search results provided for both the first search query and the first additional search query; a number of result links in the corresponding provided search results clicked on for both the first search query and the first additional search query; and similarity between the title or uniform resource locator (URL) of a web page included in the search results provided for the first search query and the title or URL of a web page included in the search results provided for the first additional search query.

A secondary analysis component identifies one or more supplemental strings that are related to the first user search query. A list population component incorporates the first additional search query into a list of strings related to the first user search query when the first additional search query is determined to be related to the first user search query. The list population component also incorporates the identified supplemental strings into the list of strings related to the first user search query.

In still another embodiment, click log data is accessed. Session data for a user search query session in the accessed click log data is identified. The session data includes: a first user search query; search results provided for the first user search query; one or more additional search queries; and search results provided for the one or more additional search queries. It is determined whether a first additional search query in the session data is related to the first user search query based on a similarity between the title or uniform resource locator (URL) of a web page included in the search results provided for the first search query and the title or URL of a web page included in the search results provided for the first additional search query exceeding a similarity threshold. The determination is also based on at least one of: dwell time on search results provided for both the first search query and the first additional search query; and a number of result links in the corresponding provided search results clicked on for both the first search query and the first additional search query. Upon determining that the first additional search query is related to the first user search query, the first additional search query is incorporated into a list of strings related to the first user search query.

One or more supplemental strings that are related to the first user search query are identified. The supplemental strings include at least one of: the title or URL of a web page included in the search results provided for either the first search query or the first additional search query that was clicked on after the corresponding search results were provided; a snippet corresponding to a web page included in the search results provided for either the first user query or the first additional search query that was clicked on after the corresponding search results were provided; and a second user search query identified using random walk analysis such that the second user search query is identified when a URL included in the search results provided for the first user search query is clicked on and a similar URL included in the search results provided for the second user search query is also clicked on. The identified supplemental strings are incorporated into the list of strings related to the first user search query.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media typically embodies computer-readable instructions, data structures, program modules, or other data in a modulated data signal such as a carrier wave. The term "modulated data signal" refers to a propagated signal that has one or more of its characteristics set or changed to encode information in the signal. By way of example, and not limitation, communication media includes wired media, such as a wired network or direct-wired connection, and wireless media such as acoustic, RF, infrared, radio, microwave, spread-spectrum, and other wireless media. Combinations of the above are included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention relate to systems, methods, and computer media for identifying related strings for search query rewriting. Embodiments of the present invention will be discussed with reference to FIGS. 2-7.

Figure 2:
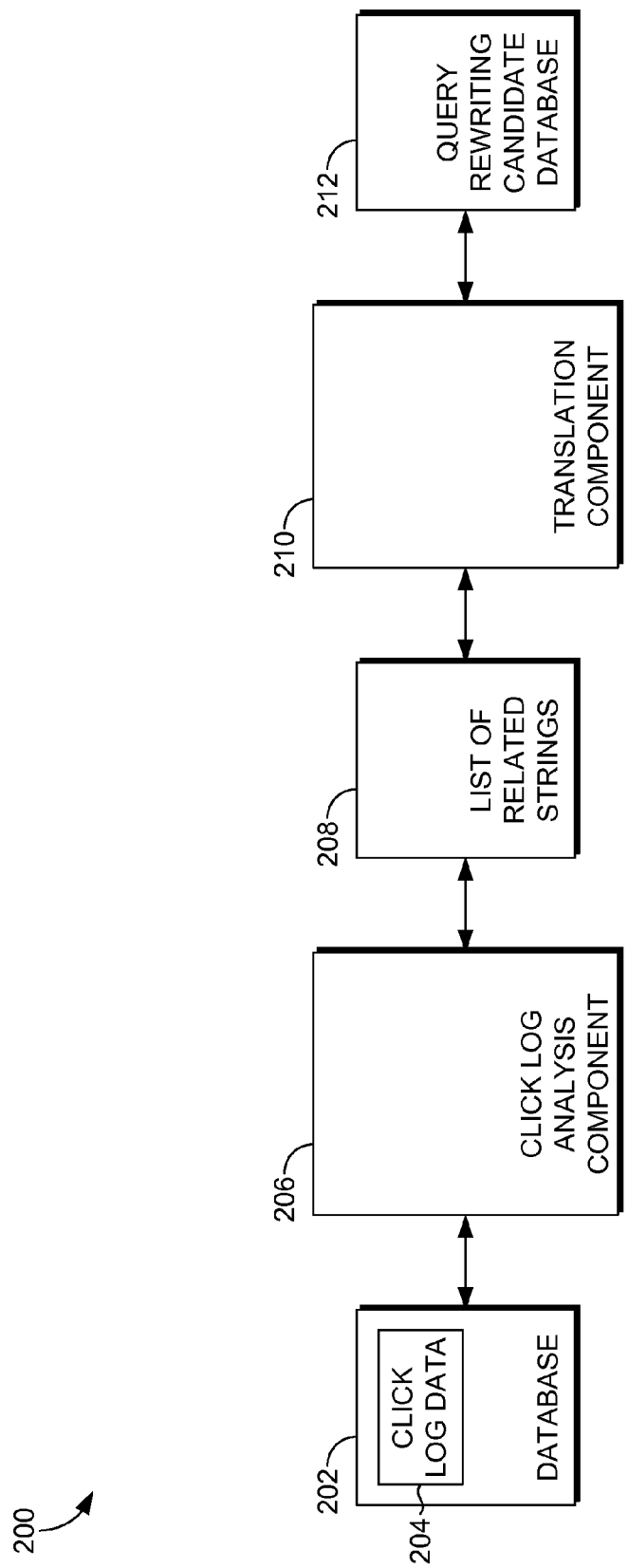
FIG. 2 is a block diagram of an exemplary query rewriting candidate term determination system in accordance with embodiments of the present invention.

FIG. 2 is a block diagram illustrating a system 200 that determines query rewriting candidate terms. Database 202 contains click log data 204. Search query click logs include data such as the search queries users enter, results provided, result web page links clicked on, dwell time for the results page and clicked-on links, and other information. Click logs are maintained by conventional search engines, often to track user behavior for search engine improvement or advertising purposes. Click log analysis component 206 analyzes click log data 204 to identify strings related to a user search query. The identified strings can be additional search queries or other supplemental strings. Identified strings are stored, along with the user search query to which they are related, in a list of related strings 208.

Translation component 210 receives data from list of related strings 208 to identify query rewriting replacement candidate terms. In some embodiments, translation component 210 runs a statistical machine translation model that receives as inputs two related strings from list of related strings 208. A pair of related query terms, one from each of the two input strings, can then be identified. Pairs of terms identified as being related by translation component 210 can be incorporated into query rewriting candidate database 212. Database 212 can then be used by search engines for query rewriting.

Figure 3:
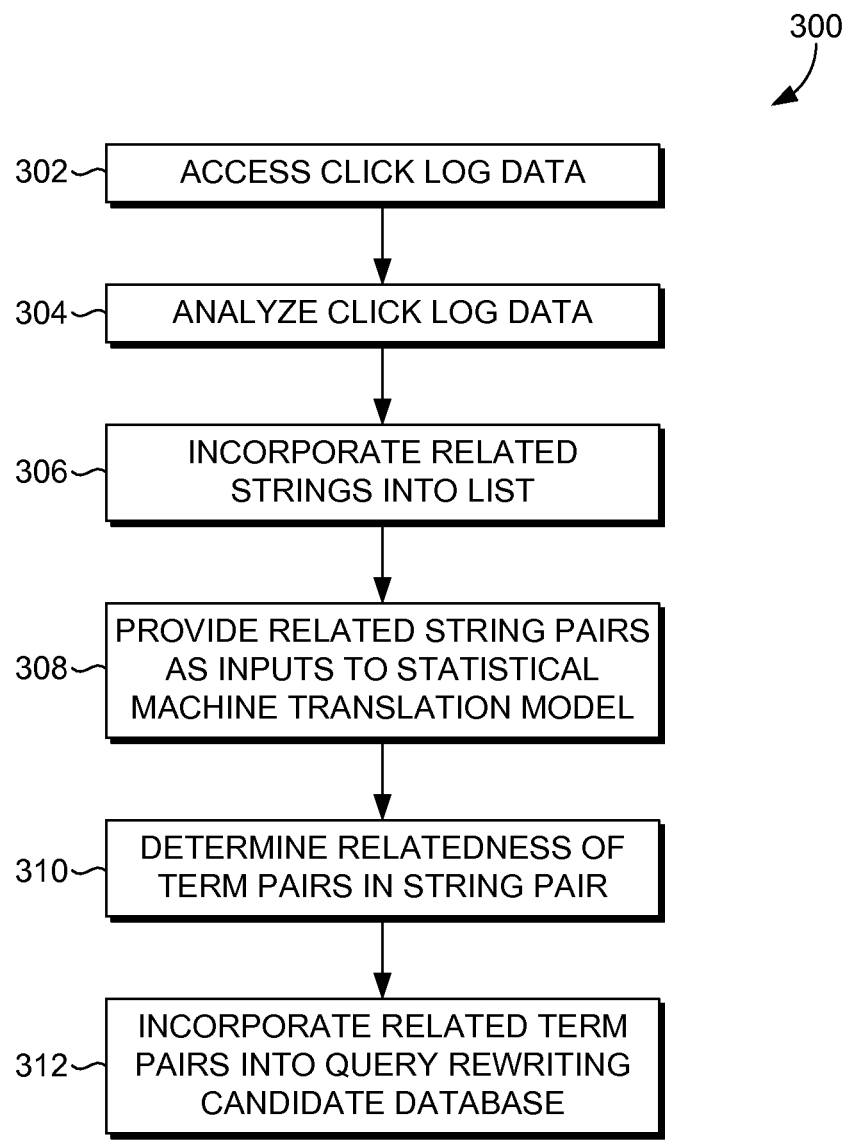
FIG. 3 is a flow chart of an exemplary method for determining query rewriting candidate terms using click log data and statistical machine translation.

FIG. 3 is a flow chart of an exemplary method 300 for determining query rewriting candidate terms using click log data and statistical machine translation. In step 302, click log data is accessed. In step 304, the click log data is analyzed to identify strings related to a user search query. Identified related strings are incorporated into a related strings list in step 306. In step 308, a pair of related strings from the list are provided as inputs to a statistical machine translation model. In some embodiments, string pairs from a source other than click log analysis are input to the model. In step 310, the probability of relatedness for term pairs in a string pair is determined. Term pairs having a probability of relatedness above a threshold are incorporated into a query rewriting candidate database for use in search query rewriting in step 312.

Exemplary functionality and components of click log analysis component 206 and translation component 210 of FIG. 2 are discussed below in detail.

Click Log Analysis

Figure 4:
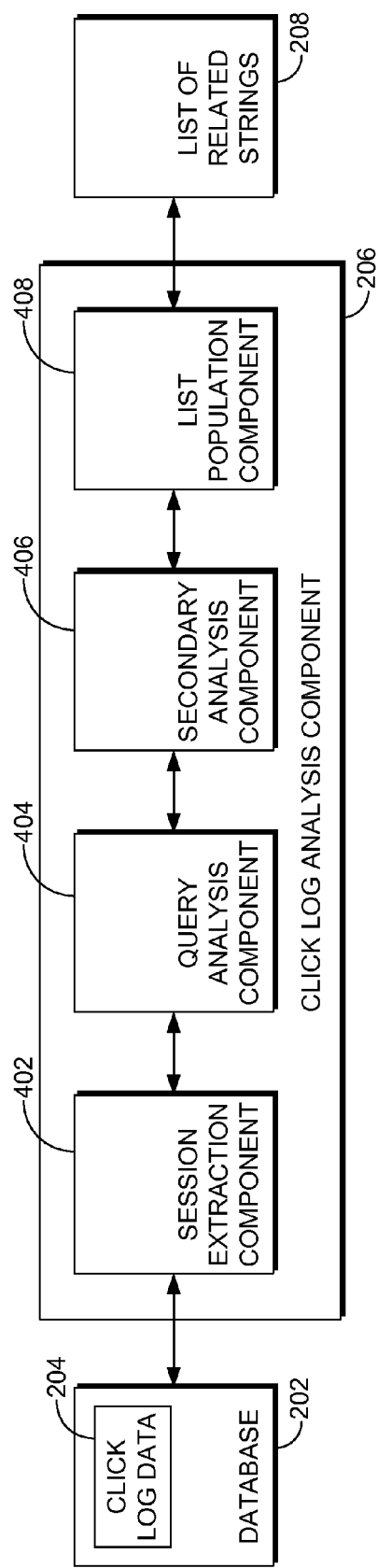
FIG. 4 is a block diagram of an exemplary click log analysis component from the system shown in FIG. 2.

FIG. 4 is a block diagram of an exemplary click log analysis component 206 from the system shown in FIG. 2. Click log analysis component 206 accesses and analyzes click log data 204, identifies related strings from click log data 204, and incorporates related strings in list of related strings 208. Session extraction component 402 identifies session data for a user search query session in click log data 204. Click log data 204 may include multiple search query sessions for the same or different users. In one embodiment, the session data include a first user search query and search results provided for the first user search query. The session data may also include one or more additional search queries and search results provided for the one or more additional search queries. Additional information, including but not limited to which result links in provided search results are clicked on, the order in which search result links are clicked on, dwell time for provided search results pages, and dwell time for result links clicked on may also be included.

Query analysis component 404 analyzes queries identified in a session. Each session may include a number of queries. Query analysis component 404 begins with a first user query and determines whether a first additional search query in the session data is related to the first user query. Although a session may include a number of queries, not all queries in the session are necessarily related. In some instances, users submit subsequent queries to refine a previous query. In other instances, the user may have decided to search for something slightly different from or altogether unrelated to the original query. Additional queries are therefore analyzed to determine if the additional queries are actually related to the first user search query.

A determination of relatedness can be based on a number of factors. Two queries may be more likely to be related if the queries are part of the same session, have query terms in common, have query terms in one query that are recognized synonyms, abbreviations, different tenses, etc, of terms in the other query, are submitted within a predefined time period, or are submitted one after the other. In some instances, however, such considerations do not adequately remove unrelated queries, which can be thought of as "noise" in the data. In some embodiments, additional or alternative factors are considered that may be thought of as "filtering out" the unrelated or noisy queries.

In one embodiment, the first additional search query is determined to be related to the first user search query based on the dwell time on search results provided for both the first search query and the first additional search query. Dwell time refers to the length of time a user interacts with or views a provided search results page or an individual web page associated with a result link in the provided search results. In many cases, a longer dwell time on a particular page indicates that the page includes information that satisfied the user's query. A shorter dwell time may indicate that the page does not include information that the user finds useful.

In another embodiment, it is determined that the first additional search query in the session data is related to the first user search query when the dwell time for the search results provided for the first additional search query is longer than the dwell time for the search results provided for the first user search query. In still another embodiment, it is determined that the first additional search query in the session data is related when a weighted dwell time for individual web pages clicked on from the search results provided for the first additional search query is longer than a weighted dwell time for the individual web pages clicked on from the search results provided for the first user search query.

Another factor on which a determination of relatedness can be based is a number of search result links clicked on. In one embodiment, it is determined that the first additional search query in the session data is related when the number of result links clicked on for the first additional search query is higher than the number of result links clicked on for the first user search query. Query analysis component 404 may also base the determination of relatedness on similarity between web page titles or URLs. As used herein, "URL" refers to the URL string rather than the web page itself. In one embodiment, it is determined that the first additional search query in the session data is related when the title or URL of a web page included in the search results provided for the first search query and the title or URL of a web page included in the search results provided for the first additional search query are determined to have a similarity greater than a similarity threshold. Similarity may be measured as Jaccard similarity, in which the intersection of two sets is divided by the union of the sets. The similarity threshold may be pre-defined and may be dynamically adjusted as query analysis component 404 compares queries.

In some cases, query analysis component 404 may only identify a small number of related queries from the session data. Secondary analysis component 406 identifies one or more supplemental strings that are related to the first user search query. Rather than simply analyzing other queries found in the session data, secondary analysis component analyzes other information present in the session data. Although the term "supplemental strings" is used, in some embodiments of the invention, click log analysis component 206 only identifies supplemental strings and does not identify additional search queries. Supplemental strings may include the title or URL of a web page included in the search results provided for either the first search query or the first additional search query that was clicked on after the corresponding search results were provided. In some embodiments, a filtering mechanism is implemented to, for example, only include the titles or URLs of links clicked on with certain frequency.

In many cases, the title of a web page included in search results provided for a query can be thought of as a refined version of the query or the ideal rewrite of the query. Thus, the web page title or URL can be considered to be a string related to the user search query. Similarly, the title or URL of web pages included in search results for additional queries previously determined to be related to a user search query, such as the additional queries identified by query analysis component 404, can also be considered to be a string related to the user search query. In some embodiments, web pages clicked on from a provided search results page for which a dwell time is longer are considered to be more related than clicked-on pages having a shorter dwell time.

Another type of supplemental string considered by secondary analysis component 406 is a web page snippet. Search results typically include a hyperlink to a web page related to a user query as well as a few sentences, phrases, or other type of short summary of the relevant content included in the linked web page. A snippet, either in part or in its entirety, corresponding to a web page included in the search results provided for either the first user query or the first additional search query that was clicked on after the corresponding search results were provided can be considered to be a related string. Similarly to the way in which a title of a clicked-on result link can be considered to be related, if a user enters a search query and clicks on a provided result link, it is probable that the content included in the corresponding snippet is a string related to the user query. The user's selection of the web page from the search results provides an implied "approval" of the relatedness. In some embodiments, snippets corresponding to provided results not clicked on by the user are also considered. For example, if a user has clicked on one or more returned result links, other result links in the provided search results may be considered to be related.

Secondary analysis component 406 may also use random walk analysis to identify supplemental strings. Random walk analysis is well known and has been applied in many disciplines. A detailed discussion of random walk analysis is beyond the scope of this discussion. In one embodiment, a second user search query is identified using random walk analysis such that the second user search query is identified when a URL included in the search results provided for the first user search query is clicked on and a similar URL included in the search results provided for the second user search query is also clicked on. In some embodiments, two queries are identified as related when the clicked-on URLs are identical. The idea behind this type of analysis is that if two different queries both lead to the same search result, then the queries may be related in some manner.

In some embodiments, the second user search query is determined to be more related to the first user search query when additional URLs included in the search results provided for the first user search query are clicked on and similar URLs included in the search results provided for the second user search query are also clicked on. Thus, two queries that have five returned search result links clicked on in common, for example, are considered to be more related than two queries with only one search result link clicked on in common. Similarly, two user search queries are determined to be more strongly related when links commonly clicked on for both queries have been clicked on a larger number of times. Random walk analysis may compare queries from different users and different sessions.

When query analysis component 404 identifies an additional query as related to a particular query, list population component 408 incorporates the additional search query into list of strings 208 related to the particular query. Similarly, list population component 408 incorporates supplemental strings identified by secondary analysis component 406 into list of related strings 208. It is contemplated that the functionality of the various components of click log analysis component 206 may be combined, separated, and distributed in a variety of ways.

Figure 5:
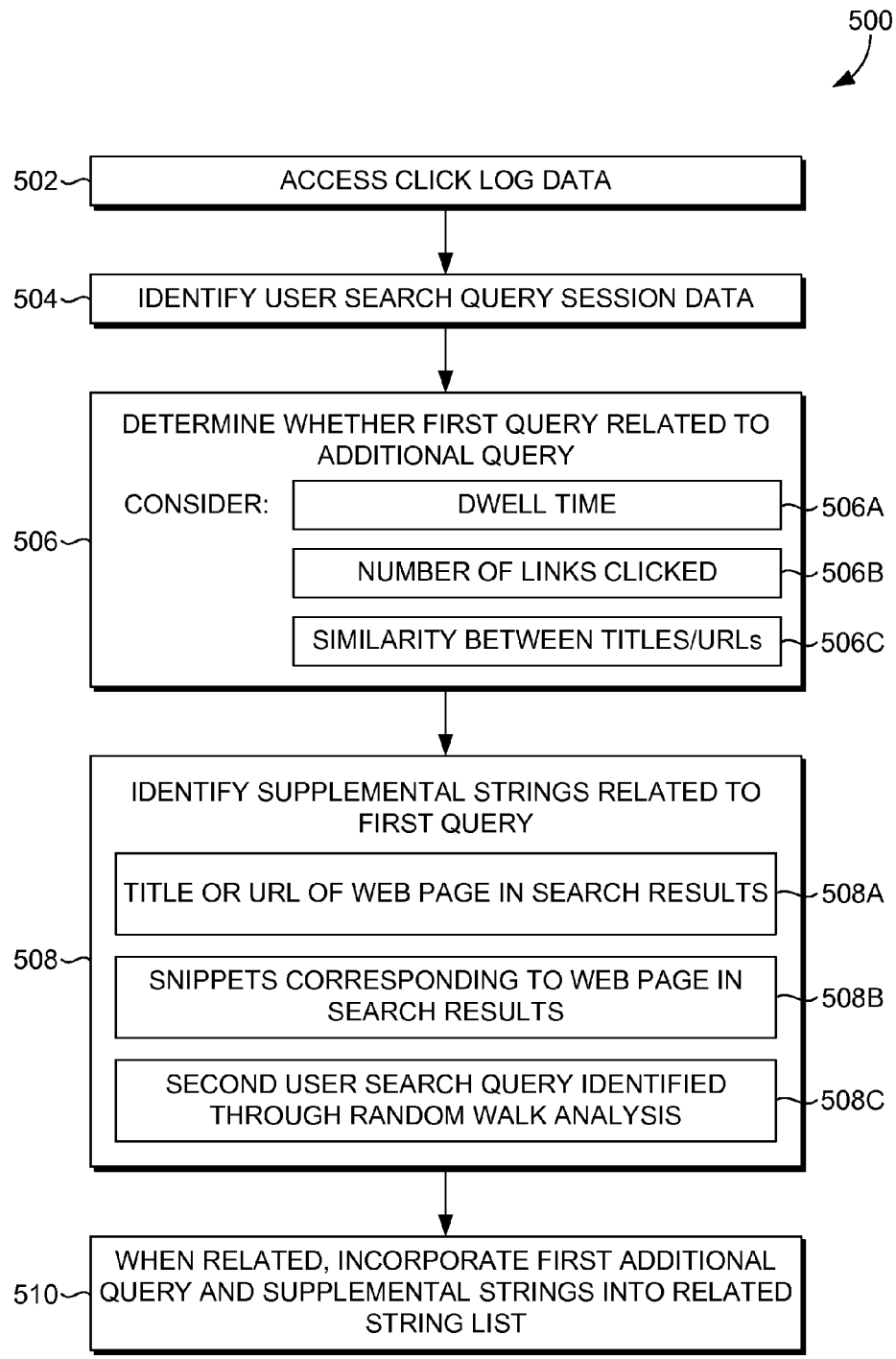
FIG. 5 is a flow chart of an exemplary method for identifying related strings for search query rewriting by analyzing click log data.

FIG. 5 illustrates an exemplary method 500 for identifying related strings for search query rewriting by analyzing click log data. In step 502, click log data is accessed. In step 504, user search query session data is identified. It is determined that a first user search query is related to an additional search query in step 506. The determination in step 506 may be made based at least in part on one or all of: dwell time 506A; number of links clicked 506B; and similarity between titles or URLs. Supplemental strings related to the first user search query are identified in step 508. Identified supplemental strings may include one or all of: the title or URL 508A of a web page in search results provided for the first user query or a related user query; snippets 508B corresponding to a web page in search results provided for the first user query or a related user query; and a second user search query 508C identified as related through random walk analysis.

In step 510, upon determining in step 506 that an additional query is related to the first user query, the additional query is incorporated into a list of strings related to the first user query. Also in step 510, supplemental strings identified as related in step 508 are also incorporated into the related strings list. In some embodiments, step 510 is partially implemented after step 506 when additional related queries are identified and partially implemented after step 508 when related supplemental strings are identified.

Statistical Machine Translation

FIGS. 4 and 5 detail the analysis of click log data to identify strings related to a first user query. Related strings are included in list of related strings 208. While a list of strings related to a search query is useful in performing query rewriting, breaking down the related strings into one or more pairs of related terms is also of value. Translation component 210 receives related strings pairs and produces related term pairs that can be used as query term replacements for query rewriting. While translation component 210 is shown in FIG. 6 as analyzing string pairs from related string list 208, it is contemplated that translation component 210 can analyze any provided string pairs.

Figure 6:
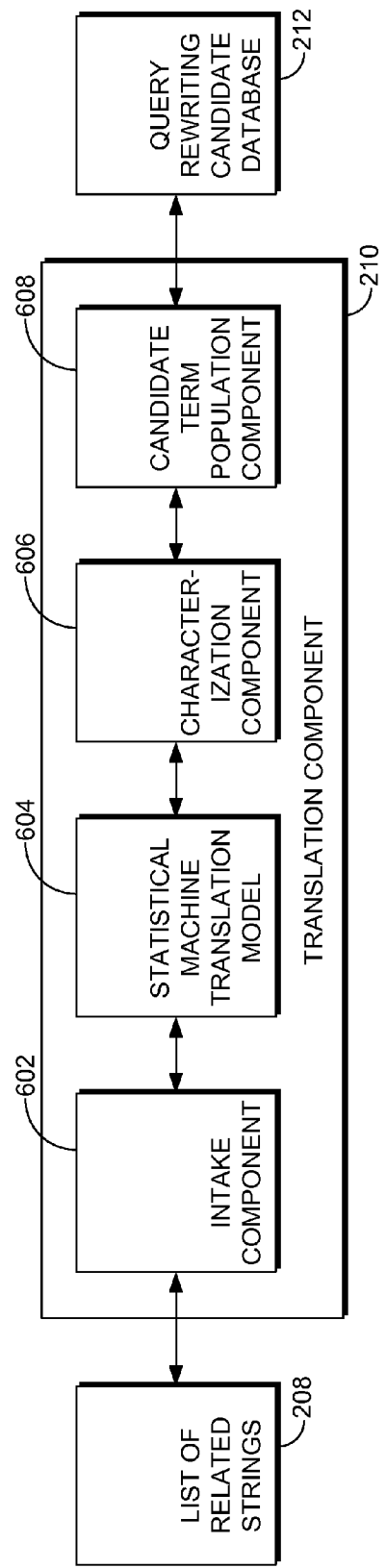
FIG. 6 is a block diagram of an exemplary translation component from the system shown in FIG. 2.

FIG. 6 details translation component 210 in FIG. 2. Intake component 602 receives a pair of related strings, such as related strings identified by click log analysis component 206 in FIG. 2. In one embodiment, each pair comprises a first string and a second string, where the first string of each related string pair is a user search query extracted from user click log data, and the user click log data includes data for one or more search query sessions. Related string pairs are provided as inputs to statistical machine translation model 604. Statistical machine translation (SMT) is well known but has conventionally been applied to two different languages. Typically, a first language and a second language are provided to a model, and the model is able to identify the terms from both languages that have the same meaning. One common SMT model is the IBM model 1. SMT model 604 effectively treats one string in a received pair as a first language and the second string as a second language. SMT is thus able to overcome the query-document vocabulary mismatch by translating between the two "languages."

In one embodiment one or more pairs of corresponding terms are identified by SMT model 604, each pair of corresponding terms including a first term from the first string and a second term from the second string. SMT model 604 then calculates a probability of relatedness for each of the one or more pairs of corresponding terms. When a calculated probability of relatedness of a pair of terms exceeds a threshold, characterization component 606 characterizes the second term as a potential query term replacement for the first term. In some embodiments, the probability of relatedness threshold is a probability of 0.001. For each pair of corresponding terms for which the calculated probability of relatedness exceeds a threshold, candidate term population component 608 incorporates the first term, the second term and the probability of relatedness for the pair into query rewriting candidate database 212.

The probability of relatedness may in some embodiments be an average of probabilities received for the same or similar two terms that are calculated from different string pair comparisons. For example, if term A and term B are identified by SMT model 604 as being corresponding terms for string comparison 1 and string comparison 2, then two different probabilities of relatedness will be calculated, one for each comparison. The probability of relatedness stored in query rewriting candidate database 212 may be an average, weighted or unweighted, of the calculated probabilities. In some instances, one pair of related strings may be considered to be more related than another pair of related strings. Translation component 210 can account for a relatedness weighting by inputting additional instances of a highly related string pair into SMT model 604 such that the average measure of relatedness stored in query rewriting candidate database 212 reflects the weighting. In this way, weighting is accomplished not through, for example, multiplication by a weighting factor at database 212 but instead by increasing the number of instances of the highly related string that are averaged to calculate the overall probability of relatedness for the two terms.

SMT model 604 is trained in order to provide meaningful results for subsequently input query pairs. In some embodiments, pairs of queries and related strings such as additional queries and supplemental strings are provided for training. An algorithm is then used to train SMT model 604. In one embodiment, the EM (expectation/maximization) algorithm, which is well known in the art, is applied.

In some embodiments, SMT model 604 is IBM model 1. Conventionally, IBM model 1 and other SMTs identify a first term that corresponds to a second term. In some embodiments, SMT model 604 is modified to identify groups of corresponding terms such that a probability of relatedness is calculated between a first group of two or more terms and a second group of two or more terms. For example, SMT model 604 may be modified to identify two terms in a first string corresponding to two terms in a second string.

In one embodiment, the second string of each related string pair provided to SMT model 604 is identified by analyzing user click log data. In other embodiments, the second string of at least one related string pair is an additional search query extracted from the same search query session in the click log data as the corresponding first string. In further embodiments, the second string of at least one related string pair is the title or URL of a web page included in search results provided for either the user search query or an additional search query that was clicked on after the corresponding search results were provided. In still further embodiments, the second string of at least one related string pair is a snippet corresponding to a web page included in search results provided for either the user search query or an additional search query that was clicked on after the corresponding search results were provided. In another embodiment, the second string of at least one related string pair is an additional user search query identified using random walk analysis such that the additional user search query is identified when a URL included in search results provided for the user search query is clicked on and a similar URL included in search results provided for the additional user search query is also clicked on.

Figure 7:
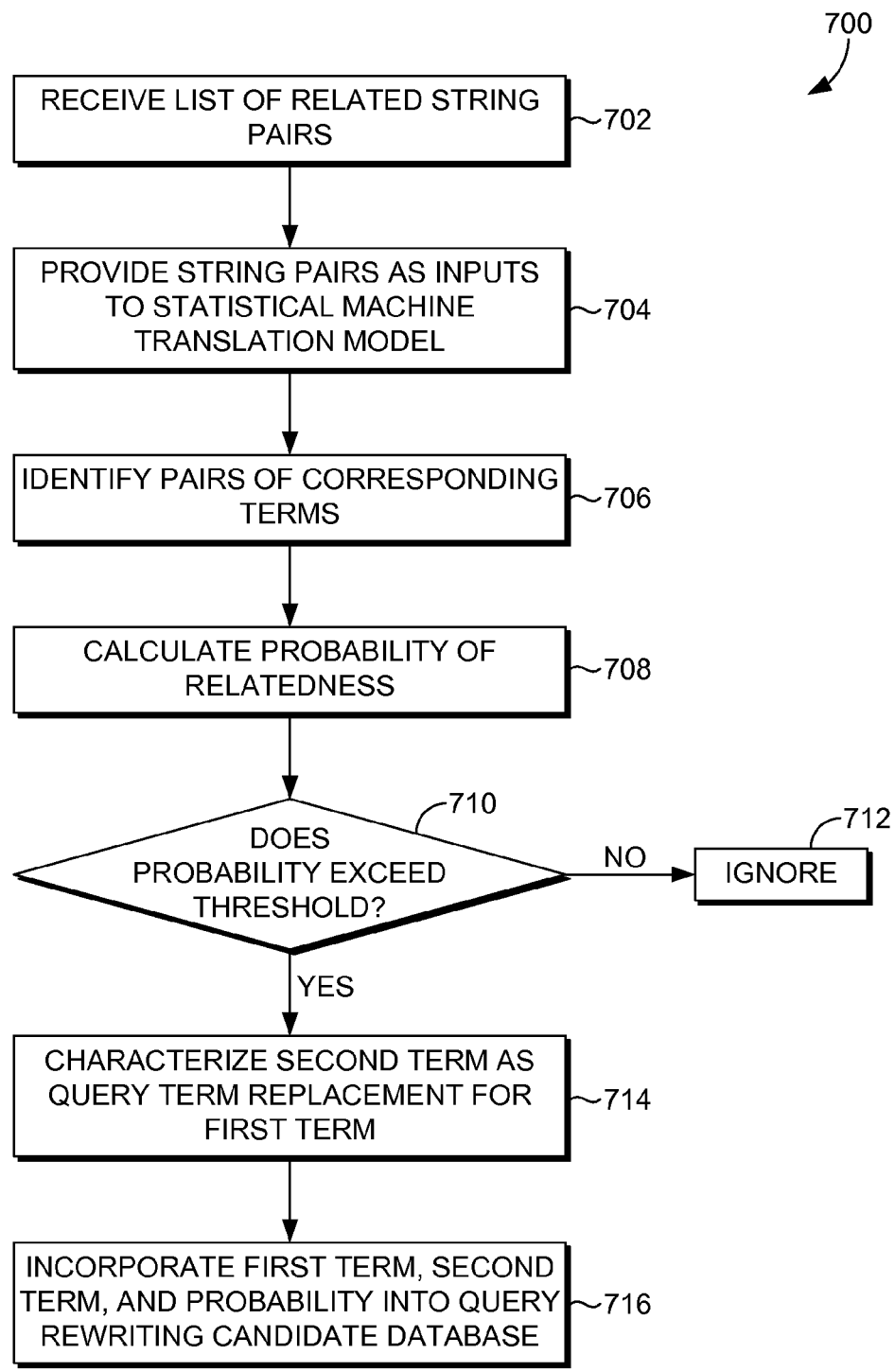
FIG. 7 is a flow chart of an exemplary method for identifying query rewriting replacement terms using statistical machine translation.

FIG. 7 illustrates an exemplary method 700 for identifying query rewriting replacement terms using statistical machine translation. A list of related string pairs is received in step 702. The list of related pairs may be determined through click log analysis, for example as illustrated in FIG. 5. In step 704, related string pairs are provided as inputs to an SMT model. In step 706, pairs of corresponding terms are identified. A probability of relatedness for pairs of corresponding terms is calculated in step 708. In step 710, it is determined whether the calculated probability of relatedness exceeds a threshold. If the probability does not exceed the threshold, the second term is considered to be a poor replacement term candidate for the first term and the pair is ignored in step 712. If the probability of relatedness does exceed a threshold, then the second term is characterized as a query term replacement for the first term in step 714. The first term, second term, and probability of relatedness are then incorporated into a query rewriting candidate database in step 716. The database can be accessed by search engines to identify query term replacement candidates for future user search queries.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. One or more computer storage media storing computer-executable instructions for performing a method for identifying related strings for search query rewriting, the method comprising:

accessing click log data;

identifying session data for a user search query session in the accessed click log data, the session data including:
  a first user search query,
  a first set of search results provided for the first user search query,
  one or more additional search queries, and
  search results provided for the one or more additional search queries including a second set of search results provided for a first additional search query;

determining that the first additional search query in the session data is related to the first user search query based on: (1) a similarity between the title or uniform resource locator (URL) of a web page included in the first set of search results and the title or URL of a web page included in the second set of search results exceeding a similarity threshold and (2) at least one of:
  (a) a comparison of dwell time between the first and second sets of search results, or
  (b) a comparison of a number of result links clicked on between the first and second sets of search results;

in response to determining that the first additional search query is related to the first user search query, incorporating the first additional search query into a list of strings related to the first user search query;

identifying one or more supplemental strings that are related to the first user search query, the supplemental strings including at least one of:
  the title or URL of a web page included in the search results provided for either the first search query or the first additional search query that was clicked on after the corresponding search results were provided,
  a snippet corresponding to a web page included in the search results provided for either the first user query or the first additional search query that was clicked on after the corresponding search results were provided, or
  a second user search query identified using random walk analysis such that the second user search query is identified when a URL included in the search results provided for the first user search query is clicked on and a similar URL included in the search results provided for the second user search query is also clicked on;

incorporating the identified supplemental strings into the list of strings related to the first user search query; and from the list of strings, each string having at least one term, determining a probability of relatedness for a first term from a first string and a second term from a second string;

receiving a search query submitted during a current session, wherein the search query includes the first term from the first string in the list of strings; and rewriting the search query based at least in part on the determined probability of relatedness for the first term and the second term from the second string in the list of strings.

2. The media of claim 1, wherein when it is determined that the first additional search query in the session data is related to the first user search query based on (a), then (a) further comprises determining that the dwell time for the second set of search results is longer than the dwell time for the first set of search results.

3. The media of claim 1, wherein when it is determined that the first additional search query in the session data is related to the first user search query based on (a), then (a) further comprises determining that a weighted dwell time for individual web pages clicked on from the second set of search results is longer than a weighted dwell time for the individual web pages clicked on from the first set of search results.

4. The media of claim 1, further comprises further comprising determining the similarity using a Jaccard similarity measure.

5. The media of claim 1, wherein when it is determined that the first additional search query in the session data is related to the first user search query based on (b), then (b) further comprises determining that the number of result links clicked on for the second set of results is higher than the number of result links clicked on for the first set of search results.

6. The media of claim 1, wherein for the identified one or more supplemental strings, clicked-on web pages for which a dwell time is longer are determined to be more related.

7. The media of claim 1, wherein the second user search query is determined to be more related to the first user search query when additional URLs included in the search results provided for the first user search query are clicked on and similar URLs included in the search results provided for the second user search query are also clicked on.

8. A system for identifying related strings for search query rewriting, comprising:
   one or more processors coupled to a computer storage medium, the computer storage medium having stored thereon a plurality of computer software components executable by the one or more processors, the computer software components comprising:
   a database containing click log data;
   a session extraction component that accesses click log data and identifies session data for a user search query session in the click log data, the session data including:
   a first user search query,
   a first set of search results provided for the first user search query,
   one or more additional search queries, and
   search results provided for the one or more additional search queries including a second set of search results provided for a first additional search query;
   a query analysis component that determines that the first additional search query in the session data is related to the first user search query based on: (1) a similarity between the title or uniform resource locator (URL) of a web page included in the first set of search results and the title or URL of a web page included in the second set of search results exceeding a similarity threshold and (2) at least one of:
   (a) a comparison of dwell time between the first and second sets of search results, or
   (b) a comparison of a number of result links clicked on between the first and second sets of search results;
   a secondary analysis component that identifies one or more supplemental strings that are related to the first user search query, the supplemental strings including at least one of:
   the title or URL of a web page included in the search results provided for either the first search query or the first additional search query that was clicked on after the corresponding search results were provided,
   a snippet corresponding to a web page included in the search results provided for either the first user query or the first additional search query that was clicked on after the corresponding search results were provided, or
   a second user search query identified using random walk analysis such that the second user search query is identified when a URL included in the search results provided for the first user search query is clicked on and a similar URL included in the search results provided for the second user search query is also clicked on; and
   a list population component that:
   responsive to the first additional search query being determined to be related to the first user search query, incorporates the first additional search query into a list of strings related to the first user search query,
   incorporates the identified supplemental strings into the list of strings related to the first user search query, and
   from the list of strings, each string having at least one term, determines a probability of relatedness for a first term from a first string and a second term from a second string; and
   a search engine component that
   receives a search query during a current session, wherein the search query includes the first term from the first string in the list of strings, and
   rewrites the search query based at least in part on the determined probability of relatedness for the first term and the second term from the second string in the list of strings.

9. The system of claim 8, wherein when the query analysis component determines that the first additional search query is related to the first user search query based on (a), the comparison of dwell time indicates that the dwell time for the second set of search results is longer than the dwell time for the first set of search results.

10. The system of claim 8, the similarity threshold is pre-determined and dynamically adjustable.

11. The system of claim 8, wherein clicked-on web pages for which a dwell time is higher are determined to be more related.

12. The system of claim 8, wherein the second user search query is determined to be more related to the first user search query when additional URLs included in the search results provided for the first user search query are clicked on and similar URLs included in the search results provided for the second user search query are also clicked on.

13. A method for identifying related strings for search query rewriting, the method comprising:
   accessing click log data;
   identifying session data for a user search query session in the accessed click log data, the session data including:
   a first user search query,
   a first set of search results provided for the first user search query,
   one or more additional search queries, and search results provided for the one or more additional search queries including a second set of search results provided for a first additional search query;

determining that the first additional search query in the session data is related to the first user search query based on: (1) a similarity between the title or uniform resource locator (URL) of a web page included in the first set of search results and the title or URL of a web page included in the second set of search results exceeding a similarity threshold and (2) at least one of:
  (a) a comparison of dwell time between the first and second sets of search results, or
  (b) a comparison of a number of result links clicked on between the first and second sets of search results;

upon determining that the first additional search query is related to the first user search query, incorporating the first additional search query into a list of strings related to the first user search query;

identifying one or more supplemental strings that are related to the first user search query, the supplemental strings including at least one of:
  the title or URL of a web page included in the search results provided for either the first search query or the first additional search query that was clicked on after the corresponding search results were provided,
  a snippet corresponding to a web page included in the search results provided for either the first user query or the first additional search query that was clicked on after the corresponding search results were provided, or
  a second user search query identified using random walk analysis such that the second user search query is identified when a URL included in the search results provided for the first user search query is clicked on and a similar URL included in the search results provided for the second user search query is also clicked on;

incorporating the identified supplemental strings into the list of strings related to the first user search query; and from the list of strings, each string having at least one term, determining a probability of relatedness for a first term from a first string and a second term from a second string;

receiving a search query submitted during a current session, wherein the search query includes the first term from the first string in the list of strings; and rewriting the search query based at least in part on the determined probability of relatedness for the first term and the second term from the second string in the list of strings.

14. The method of claim 13, wherein when it is determined that the first additional search query in the session data is related based on (a), then (a) further comprises determining that the dwell time for the second set of search results is longer than the dwell time for the first set of search results.

15. The method of claim 13, wherein when it is determined that the first additional search query in the session data is related based on (a), then (a) further comprises determining that a weighted dwell time for individual web pages clicked on from the second set of search results is longer than a weighted dwell time for the individual web pages clicked on from the first set of search results.

* * * * *